(12) United States Patent
Cha et al.

(10) Patent No.: US 8,672,524 B2
(45) Date of Patent: Mar. 18, 2014

(54) REAR LAMP FOR VEHICLE

(75) Inventors: Jun Ho Cha, Hwaseong-si (KR); Byeong Ho Jeong, Hwaseong-si (KR); Yang Gi Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 237 days.

(21) Appl. No.: 12/906,835

(22) Filed: Oct. 18, 2010

(65) Prior Publication Data
US 2012/0002433 A1    Jan. 5, 2012

(30) Foreign Application Priority Data
Jun. 30, 2010   (KR) .................. 10-2010-0062798

(51) Int. Cl.
*F21V 9/00* (2006.01)

(52) U.S. Cl.
USPC ........... 362/511; 362/516; 362/518; 362/543; 362/544; 362/545

(58) Field of Classification Search
USPC .................. 362/511, 517, 516, 518, 543–545
See application file for complete search history.

(56) References Cited

U.S. PATENT DOCUMENTS

| 4,733,335 A * | 3/1988 | Serizawa et al. ............... 362/503 |
| 2008/0180967 A1 * | 7/2008 | Totani et al. .................. 362/518 |

FOREIGN PATENT DOCUMENTS

| JP | 08-043671 A | 2/1996 |
| JP | 2000-331509 A | 11/2000 |
| JP | 2001-60405 A | 3/2001 |
| JP | 2004-311162 A | 11/2004 |
| JP | 2007-48489 A | 2/2007 |
| JP | 2010-3597 A | 1/2010 |
| KR | 20-0329134 Y1 | 10/2003 |
| KR | 10-0787695 B1 | 12/2007 |
| KR | 10-2009-0025932 A | 3/2009 |
| KR | 10-2009-0064326 A | 6/2009 |
| KR | 10-2010-0055984 A | 5/2010 |

* cited by examiner

*Primary Examiner* — Sean Gramling
(74) *Attorney, Agent, or Firm* — Morgan, Lewis & Bockius LLP

(57) ABSTRACT

A rear lamp apparatus for a vehicle may include a plurality of reflectors mounted in a rear lamp housing of the vehicle to reflect light emitted from light sources at various angles and a light guide provided inside the reflectors and having end portions on which the light sources are mounted to guide the light emitted from the light sources through the light guide.

10 Claims, 5 Drawing Sheets

REAR LAMP FOR VEHICLE

CROSS-REFERENCE TO RELATED APPLICATION

The present application claims priority to Korean Patent Application No. 10-2010-0062798, filed on Jun. 30, 2010, the entire contents of which is incorporated herein for all purposes by this reference.

BACKGROUND OF THE INVENTION

1. Field of the invention

The present invention relates to a rear lamp for a vehicle, and more particularly, to a rear lamp for a vehicle, which can emit a large amount of light even with a small number of light sources and which can discriminate against a rear lamp design in the related art.

2. Description of Prior Art

In general, various kinds of lighting devices are mounted in the front and rear portions of a vehicle to provide vehicle safety and driver's convenience. As such lighting devices, there are devices that directly emit light using lamps, such as headlights, rear lamps, direction indicator lamps, and the like. In addition, in the front and rear portions of the vehicle, reflectors, which operate to reflect light so that the corresponding vehicle can be easily recognized from the outside, are mounted.

Diverse types of lighting devices have been developed in the range where minimum regulations are observed in accordance with the recent trend that importance is attached to the vehicle design, and particularly, light guide devices have been actively mounted on recent vehicles so that indirect lighting effects can be displayed in a state where light sources are not directly exposed.

As illustrated in FIG. 1, a rear lamp for a vehicle in the related art includes a housing 28 having a front surface on which a reflector 26 is mounted, a bulb 24 mounted on a front center portion of the reflector 26, a shield 32 arranged spaced apart from the front of the bulb 24 to intercept heat, and a lens 30 engaged with an edge portion of the housing 28.

According to the rear lamp for a vehicle in the related art, as shown in FIG. 1, if light emitted from the bulb 24 that is a light source is reflected from the reflector 26, the reflected light is radiated in the rear direction of the vehicle through the shield 32 and the lens 30.

However, the rear lamp in the related art has the problems that since the light emission and reflection are performed simply by the bulb 24 and the reflector 26, the design of the rear lamp is made uniform. Also, if the mount number of bulbs 24 is increased to heighten the light emission effects, the manufacturing cost and the weight of the rear lamp are increased to deteriorate the merchantability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a rear lamp for a vehicle, which can emit a large amount of light even with a small number of light sources and which can discriminate against a rear lamp design in the related art.

In an aspect of the present invention, the rear lamp apparatus for a vehicle may include a plurality of reflectors mounted in a rear lamp housing of the vehicle to reflect light emitted from light sources at various angles, and a light guide provided inside the reflectors and having end portions on which the light sources are mounted to guide the light emitted from the light sources through the light guide.

The light guide may be made up of an acrylic material.

The reflectors may form at least three surfaces to implement at least three-dimensional image through the emitted light.

The light sources may be disposed approximately on a contact line of the adjacent reflectors.

The light sources may be provided with LEDs.

In another aspect of the present invention, the rear lamp apparatus may further include an auxiliary light guide additionally mounted inside the reflectors provided with the light guide.

The rear lamp apparatus may further include auxiliary light sources mounted on end portions of the auxiliary light guide, wherein the auxiliary light sources are disposed approximately on a contact line of the adjacent reflectors.

The auxiliary light sources may be provided with LEDs, wherein the auxiliary light guide may be made up of an acrylic material.

With the above-described construction according to the present invention, since a large amount of light is emitted although a small number of light sources and reflectors are used, the manufacturing cost and the weight of the rear lamp are reduced and the design of the rear lamp of the vehicle is improved to heighten the merchantability.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
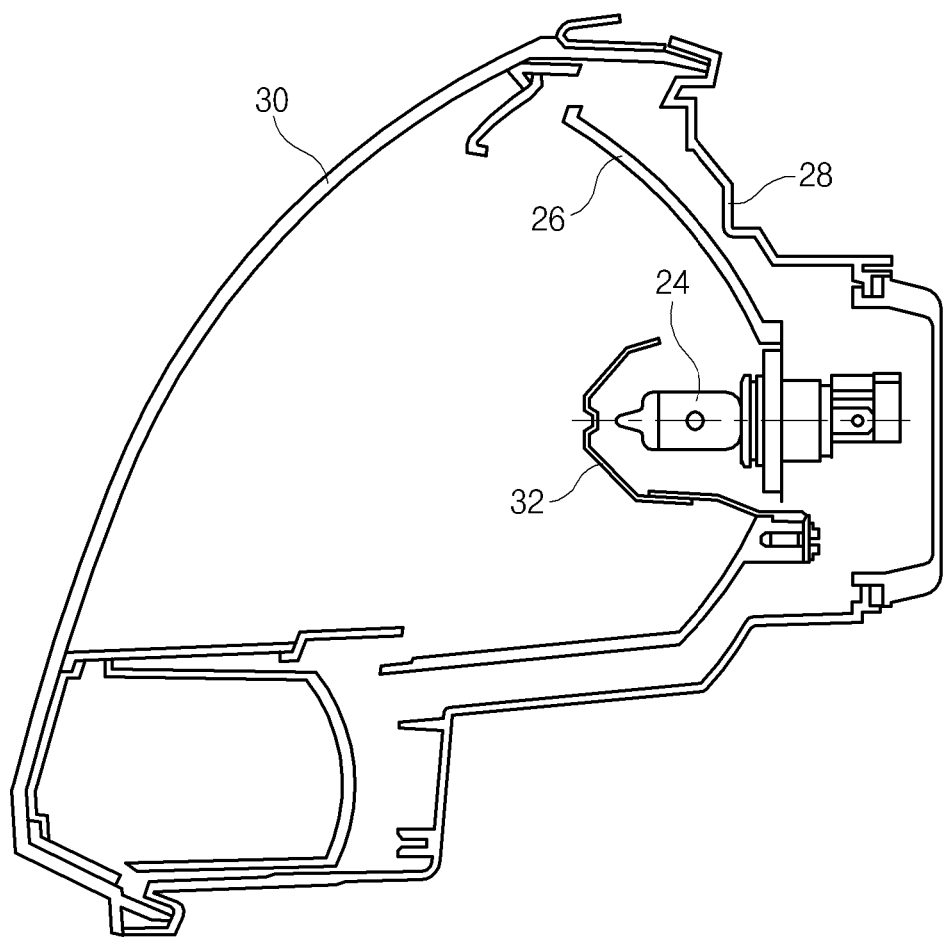
FIG. 1 is a sectional view of an exemplary rear lamp for a vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described with reference to the accompanying drawings.

Figure 2:
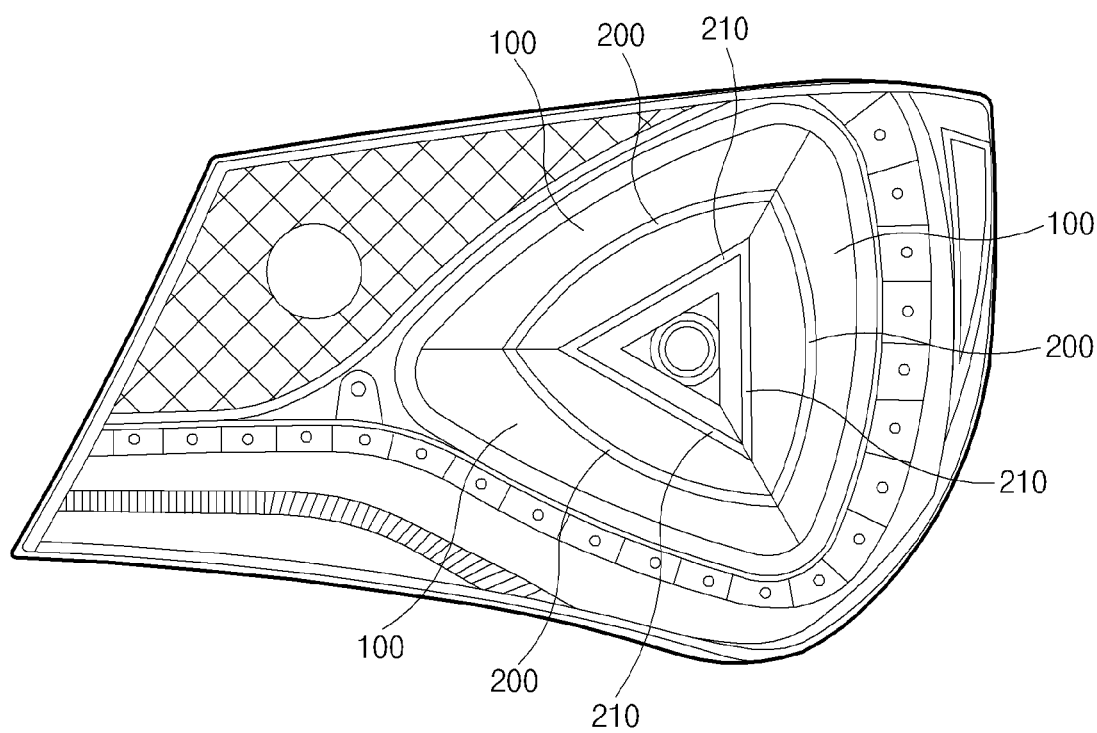
FIG. 2 is a view illustrating an exemplary rear lamp for a vehicle according to the present invention.
Figure 3:
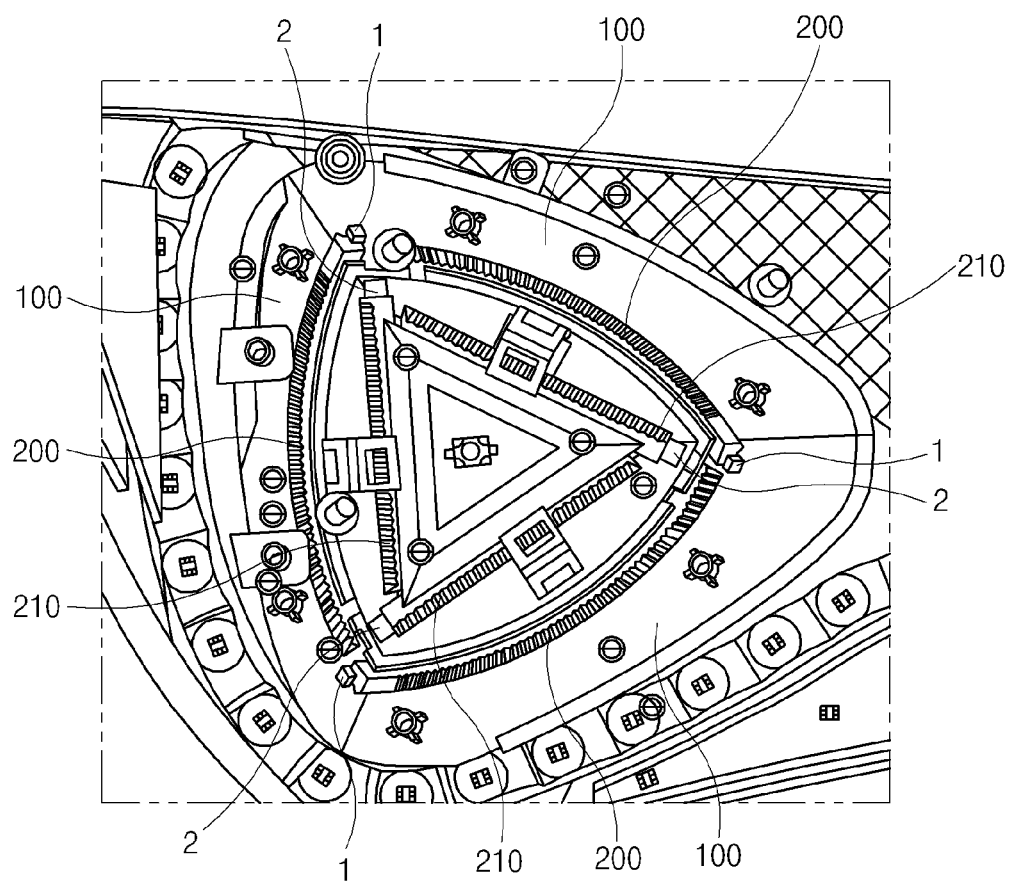
FIG. 3 is a view illustrating reflectors and a light guide provided in an exemplary rear lamp for a vehicle according to the present invention.

FIGS. 2 to 5 refer to a rear lamp for a vehicle according to the embodiments of the present invention. FIG. 2 is a view illustrating a rear lamp for a vehicle according to an exemplary embodiment of the present invention, and FIG. 3 is a view illustrating reflectors and a light guide provided in a rear lamp for a vehicle according to an exemplary embodiment of the present invention.

Figure 4:
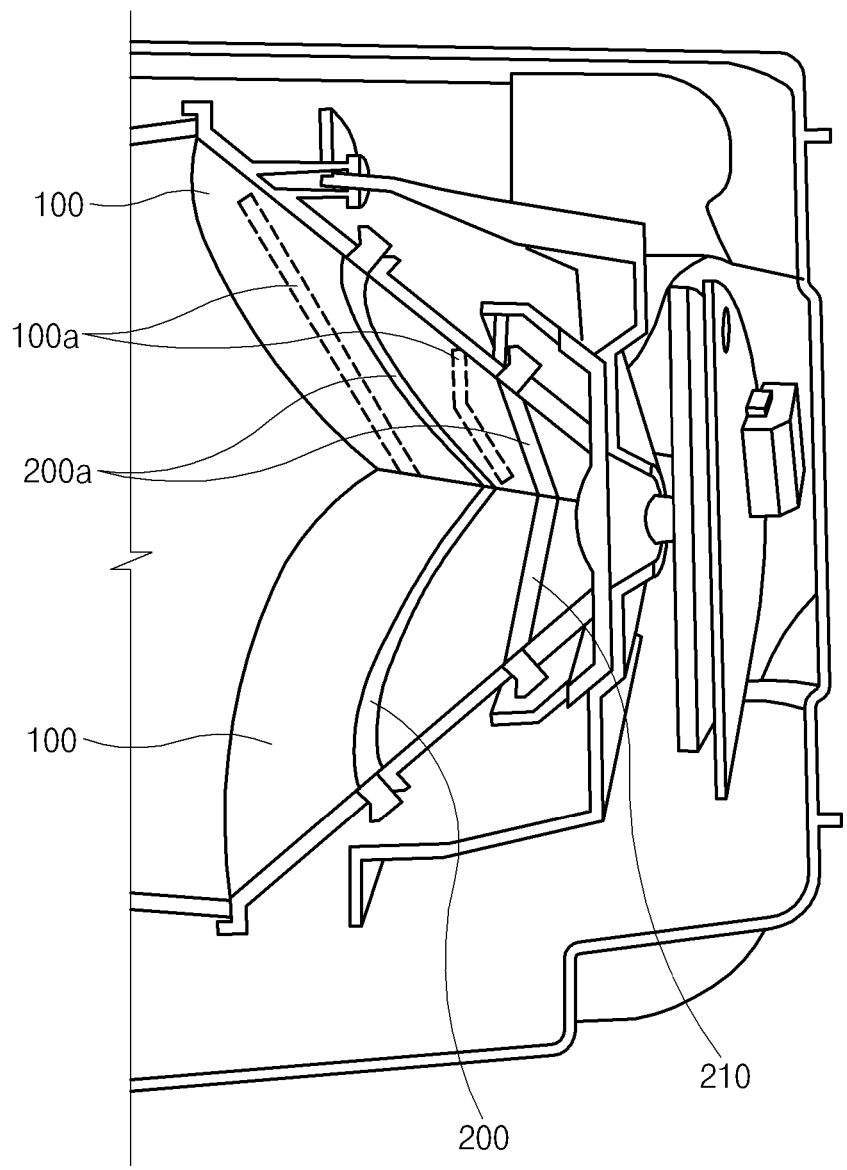
FIG. 4 is a view illustrating a light emission structure of a light source in an exemplary rear lamp for a vehicle according to the present invention.
Figure 5:
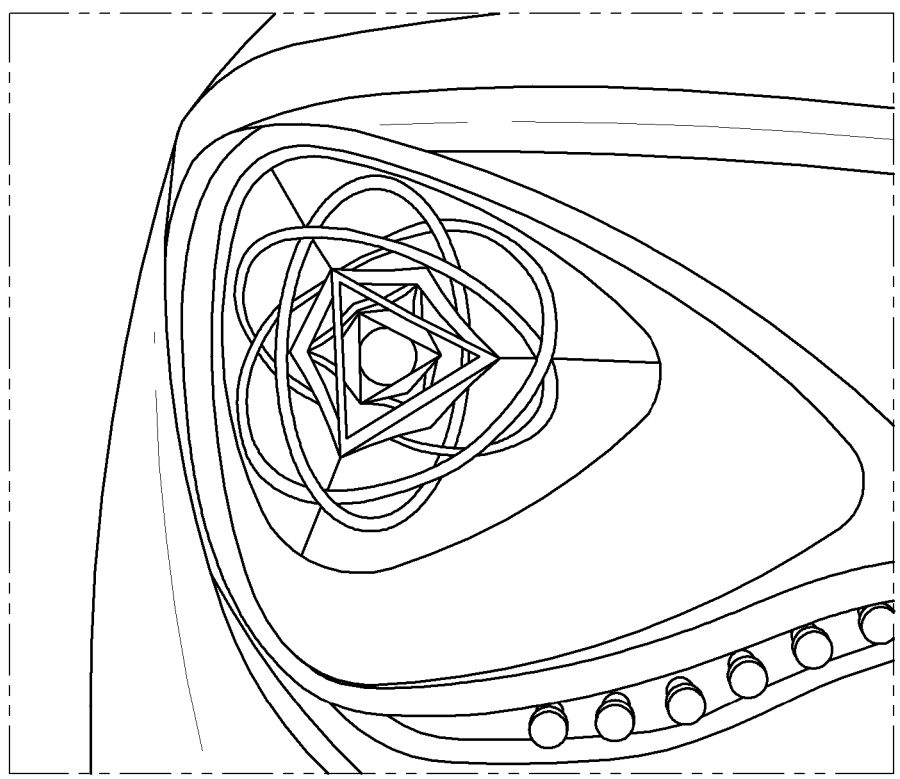
FIG. 5 is a diagram illustrating an example of an exemplary rear lamp for a vehicle according to the present invention.

Also, FIG. 4 is a view illustrating a light emission structure of a light source in a rear lamp for a vehicle according to an exemplary embodiment of the present invention, and FIG. 5 is a diagram illustrating an example of a rear lamp for a vehicle according to an exemplary embodiment of the present invention.

As illustrated in FIGS. 2 to 5, a rear lamp for a vehicle according to the embodiments of the present invention includes reflectors 100 mounted in the rear lamp of the vehicle to reflect light at various angles, and a light guide 200 provided inside the reflectors 100 to guide the light. The basic technical feature of the present invention is to improve the merchantability by improving the design of the rear lamp.

Hereinafter, constituent elements of the rear lamp for a vehicle according to the embodiments of the present invention will be described in detail with reference to the accompanying drawings.

FIG. 2 shows a rear lamp for a vehicle according to an embodiment of the present invention. The reflectors 100 are mounted inside the rear lamp, and reflects light emitted from light sources 1 to radiate the light to the outside of the rear lamp.

As illustrated in FIGS. 2 and 3, the plurality of reflectors 100 can reflect the light emitted from the light sources 1 at various angles.

On the other hand, it is preferable that the reflectors 100 have three surfaces which are combined in a three-dimensional space as illustrated in FIG. 2, and can implement a three-dimensional image with a complex shape by reflecting the emitted light through all of three surfaces of the reflectors 100.

As illustrated in FIG. 3, the light guide 200 is formed of an acrylic material that transfers the light from the light sources 1, and is provided on the inner surfaces of the reflectors 100. The end portions of the light guide are provided with the light sources 1 mounted thereon to guide the light from the light sources 1.

Also, an auxiliary light guide 210 is additionally mounted inside the reflectors 100 having the light guide 200 provided therein, and auxiliary light sources 2 are additionally mounted on the end portions of the auxiliary light guide 210. Accordingly, the light emission effects are improved, and the light reflected by the reflectors 100 having three surfaces shows the complex shape to improve the design of the rear lamp.

At this time, the light guide 200 radiates the real-image light through the light sources 1 provided on the end portions thereof, and the reflectors 100 reflects the light emitted from the light guide 200 to radiate the virtual-image light rather than the real-image light. That is, as illustrated in FIG. 4, a real-image area 200a to which the light is radiated through the light guide 200 and a virtual-image area 100a to which the reflected light is transferred are formed in the reflectors 100, and both the emitted light and the reflected light are reflected by the three surfaces of the reflectors to make it possible to implement the three-dimensional image with the complex shape through the light.

On the other hand, the light sources 1 and the auxiliary light sources 2 mounted on the end portions of the light guide 200 and the auxiliary light guide 210, respectively, are provided with LEDs (Light Emitting Diodes) to improve the visibility through the rear lamp.

In an exemplary embodiment of the present invention, the light sources 1 and the auxiliary light sources 210 may be disposed approximately on a contact line of the adjacent reflectors 100.

Hereinafter, the operation and effect of the rear lamp according to the embodiments of the present invention will be described.

As illustrated in FIGS. 2 and 3, the rear lamp according to an exemplary embodiment of the present invention can discriminate against the rear lamp design in the related art using the light guide 200, the reflectors 100, and the light 1.

At this time, the light guide 200 provided inside the reflectors 100 as illustrated in FIG. 4 radiates the real-image light through the light sources 1 provided on the end portions thereof, and the reflectors 100 reflects the light emitted from the light guide 200 to radiate the virtual-image light rather than the real-image light, resulting in that the reflectors 100 produce the real-image light through the light guide 200 and the virtual-image light reflected by the light guide 200.

On the other hand, when a driver operates the rear lamp, current is applied to the LED light sources 1 positioned at the end portions of the light guide 200, the light emitted from the light sources 1 is transferred to the outside through the light guide 200, and the image of the light emitted from the light guide 200 is transferred to eye of persons positioned outside the vehicle to be seen.

Also, the light emitted from the light guide 200 is reflected by the reflectors 100 to be transferred to the eyes of the persons, and by making the reflectors 100 match one another by 90° to form three surfaces for the efficiency and the light emission effects, the rear lamp according to an exemplary embodiment of the present invention, as illustrated in FIG. 5, can produce a three-dimensional image having a complex shape.

As described above, according to the rear lamp for a vehicle that includes the reflectors mounted in the rear lamp of the vehicle to reflect the light emitted from the light sources at various angles and the light guide provided inside the reflectors to guide the light, since a large amount of light is emitted although a small number of light sources and reflectors are used, the manufacturing cost and the weight of the rear lamp are reduced and the design of the rear lamp of the vehicle is improved to heighten the merchantability.

For convenience in explanation and accurate definition in the appended claims, the terms "upper", "lower", "inner", "outer", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear lamp apparatus for a vehicle comprising:
a plurality of reflectors mounted in a rear lamp housing of the vehicle to reflect light emitted from light sources at various angles; wherein the plurality of reflectors combine to form at least three surfaces intersecting together to implement a three-dimensional image by reflecting the emitted light;
a light guide provided inside each of the reflectors, each light guide having an end portion on which a light source is mounted to guide the light emitted from the light source through the light guide;
an auxiliary light guide additionally mounted inside each of the reflectors; and
an auxiliary light source mounted on an end portion of a respective auxiliary light guide to guide light emitted from the auxiliary light source through the auxiliary light guide;
wherein the light source and the auxiliary light source are placed within the curvature of the combined reflectors.

2. The rear lamp apparatus according to claim 1, wherein the light guide is made up of an acrylic material.

3. The rear lamp apparatus according to claim 1, wherein the light sources are disposed approximately on a contact line of the adjacent reflectors.

4. The rear lamp apparatus according to claim 1, wherein the light sources are provided with LEDs ("Light Emitting Diodes").

5. The rear lamp apparatus according to claim 1, wherein the auxiliary light source is disposed approximately on a contact line of the adjacent reflectors.

6. The rear lamp apparatus according to claim 5, wherein the auxiliary light source is provided with LEDs.

7. The rear lamp apparatus according to claim 1, wherein an end of each reflector is connected to an end of a reflector that is adjacent to the each reflector in a three dimensional shape to implement the at least three-dimensional image.

8. The rear lamp apparatus according to claim 1, wherein each of the reflectors faces a corresponding light source.

9. The rear lamp apparatus according to claim 1, wherein the light guide is placed within the curvature of the combined reflectors.

10. The rear lamp apparatus according to claim 1, wherein the auxiliary light guide is placed within the curvature of the combined reflectors.

* * * * *